US012733068B2

(12) United States Patent
Zhao et al.

(10) Patent No.: US 12,733,068 B2
(45) Date of Patent: Sep. 8, 2026

(54) METHOD FOR WIRELESS COMMUNICATION, TERMINAL DEVICE, AND NETWORK DEVICE

(71) Applicant: QUECTEL WIRELESS SOLUTIONS CO., LTD., Shanghai (CN)

(72) Inventors: Zheng Zhao, Shanghai (CN); Zhongzhi Yang, Shanghai (CN)

(73) Assignee: Quectel Wireless Solutions Co., Ltd., Shanghai (CN)

( * ) Notice: Subject to any disclaimer, the term of this patent is extended or adjusted under 35 U.S.C. 154(b) by 0 days.

(21) Appl. No.: 19/382,430

(22) Filed: Nov. 7, 2025

(65) Prior Publication Data

US 2026/0067982 A1 Mar. 5, 2026

Related U.S. Application Data

(63) Continuation of application No. PCT/CN2023/107356, filed on Jul. 14, 2023.

(51) Int. Cl.
*H04W 76/28* (2018.01)
*H04W 64/00* (2009.01)
*H04W 76/27* (2018.01)

(52) U.S. Cl.
CPC .......... *H04W 76/28* (2018.02); *H04W 64/00* (2013.01); *H04W 76/27* (2018.02)

(58) Field of Classification Search
None
See application file for complete search history.

(56) References Cited

U.S. PATENT DOCUMENTS

2022/0399976 A1* 12/2022 Wang .................... H04L 5/0051
2023/0107347 A1* 4/2023 Nader .................. H04W 76/25 455/522

FOREIGN PATENT DOCUMENTS

CN 113497687 A 10/2021

OTHER PUBLICATIONS

International Search Report in International Appln. No. PCT/CN2023/107356, mailed on Mar. 20, 2024, 5 pages (with English translation).

* cited by examiner

*Primary Examiner* — Suhail Khan
(74) *Attorney, Agent, or Firm* — Fish & Richardson P.C.

(57) ABSTRACT

The present disclosure provides a method for wireless communication, a terminal device, and a network device. One example method for wireless communication includes: receiving, by a terminal device, first configuration information that configures a first signal, where the first signal is a reference signal for positioning.

20 Claims, 5 Drawing Sheets

Terminal device 900

First reception unit 910

Second reception unit 920

METHOD FOR WIRELESS COMMUNICATION, TERMINAL DEVICE, AND NETWORK DEVICE

CROSS-REFERENCE TO RELATED APPLICATIONS

This application is a continuation of International Application No. PCT/CN2023/107356, filed on Jul. 14, 2023, the disclosure of which is hereby incorporated by reference in its entirety.

TECHNICAL FIELD

The present disclosure relates to the field of communication technology, and in particular to a method for wireless communication, a terminal device, and a network device.

BACKGROUND

In some communication systems (such as new radio (NR) systems), the discontinuous reception (DRX) mode of a terminal device and the positioning measurement process of the terminal device are designed independently of each other. The independent design of the DRX mode and the positioning measurement may result in significant power consumption.

SUMMARY

The present disclosure provides a method for wireless communication, a terminal device, and a network device. Aspects of the present disclosure will be illustrated below.

In a first aspect, a method for wireless communication is provided, including: receiving, by a terminal device, first configuration information configured to configure a first signal, where the first signal is a reference signal for positioning, and the first configuration information is determined based on discontinuous reception (DRX) parameters of the terminal device.

In a second aspect, a method for wireless communication is provided, including: sending, by a network device, first configuration information configured to configure a first signal to a terminal device, where the first signal is a reference signal for positioning, and the first configuration information is determined based on DRX parameters of the terminal device.

In a third aspect, a terminal device is provided, including: a first reception unit configured to receive first configuration information, where the first configuration information is configured to configure a first signal, the first signal is a reference signal for positioning, and the first configuration information is determined based on DRX parameters of the terminal device.

In a fourth aspect, a network device is provided, including: a first sending unit configured to send first configuration information to a terminal device, where the first configuration information is configured to configure a first signal, the first signal is a reference signal for positioning, and the first configuration information is determined based on DRX parameters of the terminal device.

In a fifth aspect, a terminal device is provided, including: a processor, a memory, and communication interfaces. The memory is configured to store one or more programs, and the processor is configured to call the one or more programs in the memory, causing the terminal device to perform some of or all operations of the method according to the first aspect.

In a sixth aspect, a network device is provided, including: a processor, a memory, and communication interfaces. The memory is configured to store one or more programs, and the processor is configured to call the one or more programs in the memory, causing the network device to perform some of or all operations of the method according to the second aspect.

In a seventh aspect, some embodiments of the present disclosure provide a communication system including the terminal device(s) and/or the network device(s) as illustrated above. In some other embodiments, the system may further include other devices in the solutions provided in the embodiments of the present disclosure that interact with the terminal device or the network device.

In an eighth aspect, some embodiments of the present disclosure provide a computer-readable storage medium configured to store computer programs, which cause a computer to perform some of or all the operations of the methods according to the aspects illustrated above.

In a ninth aspect, some embodiments of the present disclosure provide a computer program product, including non-transitory computer-readable storage medium configured to store computer programs, the computer programs are operable to cause a computer to perform some of or all the operations of the methods according to the aspects illustrated above. In some embodiments, the computer program product may be a software installation package.

In a tenth aspect, some embodiments of the present disclosure provide a computer program that is operable to causes a computer to perform some of or all the operations of the methods according to the aspects illustrated above.

In an eleventh aspect, some embodiments of the present disclosure provide a chip including a memory and a processor, where the processor is configured to call computer programs from the memory and run the computer programs, to perform some of or all the operations of the methods according to the aspects illustrated above.

In the embodiments of the present disclosure, the first signal (reference signal for positioning) is configured for the terminal device based on the DRX parameters of the terminal device, which is beneficial in preventing the terminal device from waking up from a sleep mode to send the first signal, thereby reducing the number of sleep transitions of the terminal device, and therefore reducing the power consumption of the terminal device.

DETAILED DESCRIPTION OF THE EMBODIMENTS

The following will illustrate, in conjunction with the accompanying drawings, the technical solutions of the present disclosure.

Communication System Architecture

Figure 1:
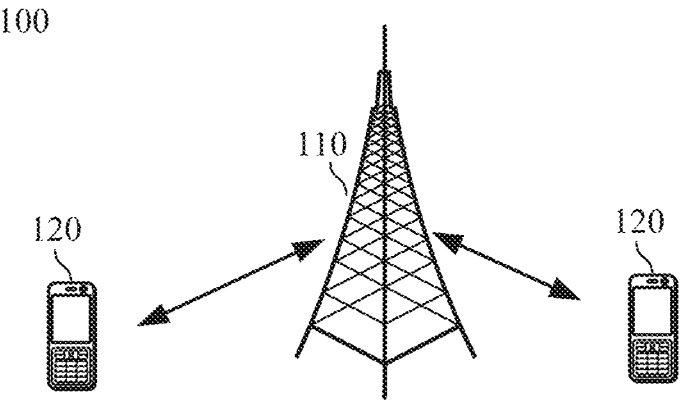
FIG. 1 shows an example of an architecture of a wireless communication system to which the embodiments of the present disclosure are applicable.

FIG. 1 shows an example of an architecture of a wireless communication system 100 to which the embodiments of the present disclosure are applicable. The wireless communication system 100 may include network devices 110 and terminal devices 120. The network devices 110 may be devices that communicate with the terminal devices 120. The network devices 110 can provide communication coverage for a specific geographic area and can communicate with the terminal devices 120 located in the coverage area.

FIG. 1 exemplarily shows a network device and two terminal devices. In some embodiments, the wireless communication system 100 may include a plurality of network devices, and there may be other numbers of terminal devices located in a respective coverage area of each network device, which will not be specified in the embodiments of the present disclosure.

In some embodiments, the wireless communication system 100 may further include other network entities such as a network controller, a mobility management entity, and the like, which will not be specified in the embodiments of the present disclosure.

It should be understood that the technical solutions of the embodiments of the present disclosure may be applied to various communication systems, such as 5th generation (5G) systems or new radio (NR) systems, long term evolution (LTE) systems, LTE frequency division duplex (FDD) systems, LTE time division duplex (TDD) systems, and the like. The technical solutions provided in the present disclosure may also be applied to future communication systems, such as the sixth generation mobile communication system, satellite communication system, and the like.

The terminal device in the embodiments of the present disclosure may be referred to as user equipment (UE), an access terminal, a user unit, a user station, a mobile station (MS), a mobile terminal (MT), a remote station, a remote terminal, a mobile device, a user terminal, a terminal, a wireless communication device, a user proxy or a user device. The terminal device in the embodiments of the present disclosure may refer to a device that provides voice and/or data connectivity to a user, and can be used to communicate people, an object and a computer, such as a handheld device or a vehicle-mounted device with wireless connection function. The terminal device in the embodiments of the present disclosure may be a mobile phone, a tablet computer (Pad), a notebook computer, a palm computer, a mobile internet device (MID), a wearable device, a virtual reality (VR) device, an augmented reality (AR) device, a wireless terminal in industrial control, a wireless terminal in self-driving, a wireless terminals in a remote medical surgery, a wireless terminals in smart grid, a wireless terminal in transportation safety, a wireless terminal in a smart city, a wireless terminal in a smart home, or the like. In some embodiments, the UE may function as a base station. For example, the UE may function as a scheduling entity that provides a lateral link signal between UEs in V2X or D2D, etc. For example, a cellular phone and a car communicate with each other using lateral link signals. The cellular phone communicates with smart home devices, without relaying communication signals by a base station.

The network device in the embodiments of the present disclosure is a device configured to communicate with a terminal device, which may also be referred to as an access network device or a wireless access network device, for example, the network device may be a base station. The network device in the embodiments of the present disclosure may refer to a radio access network (RAN) node (or device) that provides access to a wireless network for a terminal device. The base station may broadly cover the following names, or be a substitute for the following names, such as Node B, evolved NodeB (eNB), next generation NodeB (gNB), a relay station, an access point, a transmitting and receiving point (TRP), a transmitting point (TP), a master eNodeB (MeNB), a secondary eNodeB (SeNB), a multi-standard radio (MSR) node, a home base station, a network controller, an access node, a wireless node, an access point (AP), a transmitting node, a transceiver node, a base band unit (BBU), a remote radio unit (RRU), an active antenna unit (AAU), a remote radio head (RRH), a central unit (CU), a distributed unit (DU), a positioning node, and the like. The base station may be a macro base station, a micro base station, a relay node, a donor node, or a combination thereof. A base station may also be a communication module, a modem or a chip arranged in the aforementioned equipment or devices. The base station may also be a mobile switching center, a device that serves as a base station in device-to-device (D2D) communication, vehicle-to-everything (V2X) communication, machine-to-machine (M2M) communication, a network-side device in 6G network, and a device that serves as a base station in future communication systems. The base station can support networks using the same or different access technologies. The specific technology and equipment form adopted by the network device are not limited in the embodiments of the present disclosure.

The base station may be fixed or mobile. For example, a helicopter or a drone may be configured as a mobile base station, and one or more cells may move with the location of the mobile base station. In other examples, a helicopter or a drone may be configured as a device for communicating with another base station.

In some deployment, the network device in the embodiments of the present disclosure may refer to CU or DU, or the network device may include both CU and DU. gNB may also include AAU.

The network devices and the terminal devices may be deployed on land, including indoor or outdoor, handheld or vehicle boarded, or may be deployed on the water, or may further be deployed on airplanes, balloons and satellites in the air. The scenes where the network devices and the terminal devices are located is not limited in the embodiments of the present disclosure.

It should be understood that all or part of the functions of the communication devices in the present disclosure may also be implemented by the functions of software running on hardware, or by the virtualization functions instantiated on platforms (such as cloud platforms).

Positioning Technology in Communication Systems

Figure 2:
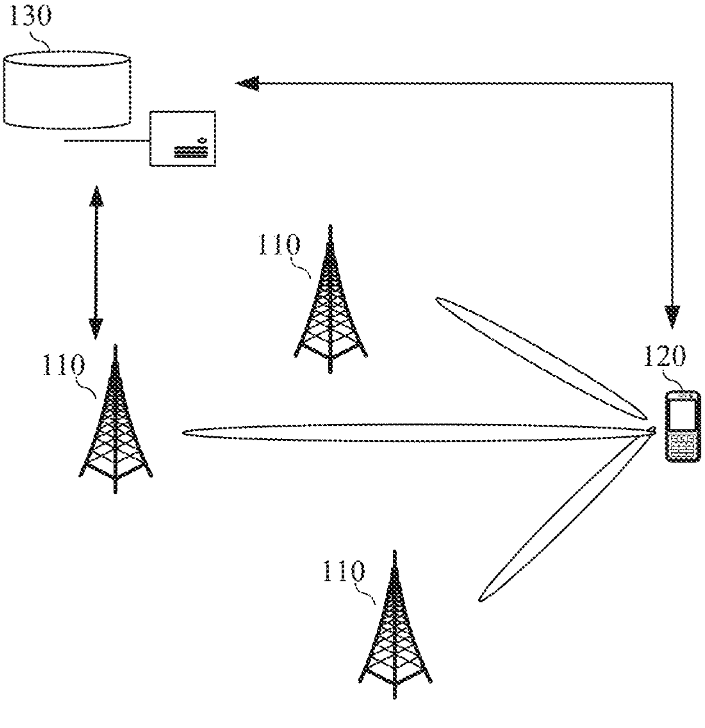
FIG. 2 is a schematic diagram of positioning measurement using the communication system shown in FIG. 1.

Referring to FIG. 2, the communication system 100 may further include a positioning device 130. The positioning device 130 may be configured to determine the location information of the terminal device and may be deployed in the core network. The positioning device 130 may also be referred to as a positioning server. Taking the NR system as an example, the positioning device 130 may be a location management function (LMF). Taking other communication systems as examples, the positioning device 130 may be a location management unit (LMU), a location management center (LMC), or an evolved serving mobile location center (E-SMLC). It shall be understood that the positioning device 130 may also be other network elements, nodes, or devices configured to determine the location information of terminal devices, such as network elements or nodes configured to determine the location information of terminal devices in future communication systems. The embodiments of the present disclosure do not specifically limit the name of the positioning device.

The positioning in the communication system 100 includes uplink positioning and downlink positioning. Some communication systems, such as NR systems, perform downlink positioning based on a positioning reference signal (PRS). PRS, also known as downlink positioning reference signal (DL-PRS), is a type of reference signal configured for positioning functions. For example, during the downlink positioning process, the terminal device 120 may first measure the PRS sent by the serving cell and neighboring cells (also known as neighborhood cells), and estimate the information relevant to the positioning measurement. Then, the terminal device 120 may report the information relevant to positioning measurement as a measurement result of PRS to the positioning device 130. The positioning device 130 may calculate the location of the terminal device 120 based on the information relevant to the positioning measurement reported by the terminal device 120, thereby obtaining the location information of the terminal device 120. For example, the positioning device 130 may calculate the location information of the terminal device 120 based on the trilateration method or triangulation method.

Some communication systems, such as NR systems, use a sounding reference signal (SRS) for uplink positioning. For example, during uplink positioning, the terminal device 120 sends SRS. The network device 110 (the network device for the serving cell and neighboring cells) may obtain measurement results based on the SRS sent by terminal device 120. The measurement results of the SRS may include the information relevant to positioning measurement. Then, the network device 110 may send the information relevant to positioning measurement to the positioning device 130. The positioning device 130 may calculate the location of the terminal device 120 based on the information relevant to positioning measurement reported by the network device 110, thereby obtaining the location information of the terminal device 120. For example, the positioning device 130 may calculate the location information of the terminal device 120 based on the trilateration method or triangulation method.

The above-mentioned information relevant to positioning measurement may include one or more of: time information, distance information, power information, and angle information. More specifically, the information relevant to positioning measurement may include one or more of: time difference of arrival (TDOA), angle difference of arrival (ADOA), reference signal receiving power (RSRP), and the like.

DRX Mode

When a terminal device adopts the DRX mode (DRX mechanism), the terminal device may periodically enter a sleep state at certain times and not monitor the physical downlink control channel (PDCCH). When it is necessary to monitor the PDCCH, the terminal device may wake up from the sleep state. The use of DRX mode by terminal devices can reduce power consumption. In some cases, the use of DRX mode by terminal devices may affect the delay of data transmission (such as an increase in the delay of data transmission). However, if the increased delay does not affect the user experience, it is meaningful for terminal devices to use the DRX mode, taking the power consumption of UE into account.

The implementation of the DRX mechanism may vary in different radio resource control (RRC) states. For example, the implementation of the DRX mechanism in an RRC_IDLE state or an RRC_INACTIVE state may be different from the implementation of the DRX mechanism in an RRC_CONNECTED state. The implementation of the DRX mechanism in RRC_CONNECTED state is relatively more complex. In some embodiments, the DRX mechanism in the RRC_IDLE state and/or the RRC_INACTIVE state may also be referred to or understood as a paging mechanism.

Figure 3:
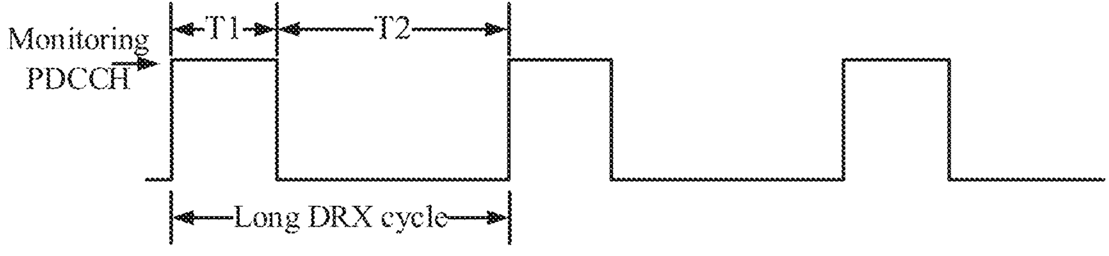
FIG. 3 is a schematic diagram of a DRX cycle.
Figure 3:
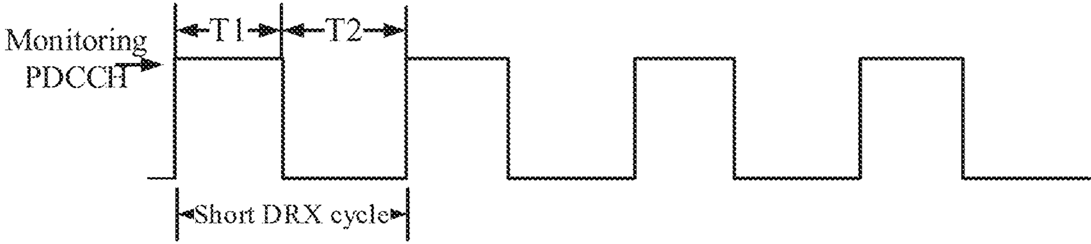

FIG. 3 is a schematic diagram of a DRX cycle. As shown in FIG. 3, T1 represents the wake-up time of the terminal device and is also known as the DRX on duration, and T2 represents the sleep time of the terminal device and is also known as the opportunity for DRX.

The duration of the wake-up time of the terminal device may be controlled by a DRX-on duration timer. The activating duration of the DRX-on duration timer is T1. The terminal device needs to continuously monitor the PDCCH during the wake-up time T1, and may not monitor the PDCCH during the sleep time T2. It can be understood that the longer the T2, the lower the energy consumption of the terminal device.

It can be seen in FIG. 3 that for a long DRX cycle, the wake-up frequency of the terminal device is relatively low, making it more energy-efficient for the terminal device. For a short DRX cycle, the wake-up frequency of the terminal device is relatively high, which increases energy consumption of the terminal device, but in turn can increase the probability of the network device successfully scheduling the terminal device, thereby reducing delay of data transmission.

Each medium access control (MAC) entity corresponds to a DRX configuration (a DRX configuration may include one or more DRX parameters), or in other words, each MAC entity corresponds to one or more DRX parameters. The DRX configuration may include the above-mentioned DRX-on duration timer. In addition, the DRX configuration may further include other DRX timers configured to jointly adjust the wake-up time of the terminal device.

Other DRX timers as mentioned above may include one or more of: a DRX-inactivity timer, a DRX-short cycle timer, a DRX-retransmission timer DL, and a DRX hybrid automatic repeat request (HARQ) round-trip time (RTT) timer (HARQ-RTT-timer DL).

The DRX-inactivity timer may indicate how long the terminal device needs to continue monitoring after successfully detecting the PDCCH. The DRX-short cycle timer may indicate the duration of the terminal device using the DRX-short cycles. The DRX-retransmission timer DL may be used for the terminal device to receive downlink retransmission scheduling, and may indicate a required duration of continuous monitoring for the terminal device to receive the expected downlink retransmission scheduling. The DRX HARQ-RTT-timer DL is used for the terminal device to receive downlink retransmission scheduling, and indicates a required waiting duration for the terminal device before receiving the expected downlink retransmission scheduling.

In addition, the network device may also configure other DRX parameters for the terminal device, such as DRX-short cycles, DRX-long cycles, DRX-long cycle start offsets, DRX-slot offsets, and the like. The network device may also configure other DRX timers, such as a ra-contention resolution timer, a DRX-retransmission timer UL, a DRX HARQ-RTT-timer UL, and the like.

In the DRX mechanism, the configuration for DRX-long cycles may be the default configuration, and the configuration for DRX-short cycles may be an optional configuration. For a terminal device configured with DRX-short cycles, the transition between DRX-long cycles and DRX-short cycles may be achieved through the following methods:

- when any one of the following conditions is met, the terminal device uses DRX-short cycles: 1. a DRX-inactivity timer times out; and 2. the terminal device receives DRX command MAC CE; and
- when any one of the following conditions is met, the terminal device uses DRX-long cycles: 1. a DRX-short cycle timer times out; and 2. the terminal device receives a long DRX command MCA CE.

When one or more of the situations as follows occur, the terminal device is in a DRX active state (also referred to as DRX on state), no matter the DRX-long cycles or the DRX-short cycles are used, and the time corresponding to the DRX active state may be referred to as DRX active time.

Situation 1: any one of the DRX-on duration timer, the DRX-inactivity timer, the DRX-retransmission timer DL, the DRX-retransmission timer UL, and the ra-contention resolution timer is running;

Situation 2: a scheduling request (SR) is sent by the terminal device on the PUCCH and is pending;

Situation 3: there is data stored in the HARQ buffer of the terminal device, and the terminal device is waiting for an UL grant for HARQ retransmission; and Situation 4: the terminal device successfully receives a random access response (RAR) in response to a preamble not selected by the MAC entity, but does not receive a PDCCH indicating the initial transmission and using the cell radio network temporary identifier (C-RNTI) of the MAC entity.

In DRX cycles, in addition to the DRX active time, the remaining time may be referred to as DRX inactive time or sleep time. In the sleep time, the terminal device is in a sleep state (also referred to as DRX off state).

Extended DRX, eDRX

The eDRX is a technology introduced in 3GPP Rel-13, which has a longer paging cycle compared to DRX, allowing terminal devices to better save power. For example, when a terminal device is in the RRC_IDLE state or the RRC_INACTIVE state, the DRX cycle and the paging cycle are the same, but eDRX has a paging cycle longer than DRX. Although the eDRX mechanism can better save power, it may also lead to longer data transmission delays (such as longer downlink data delays).

Figure 4:
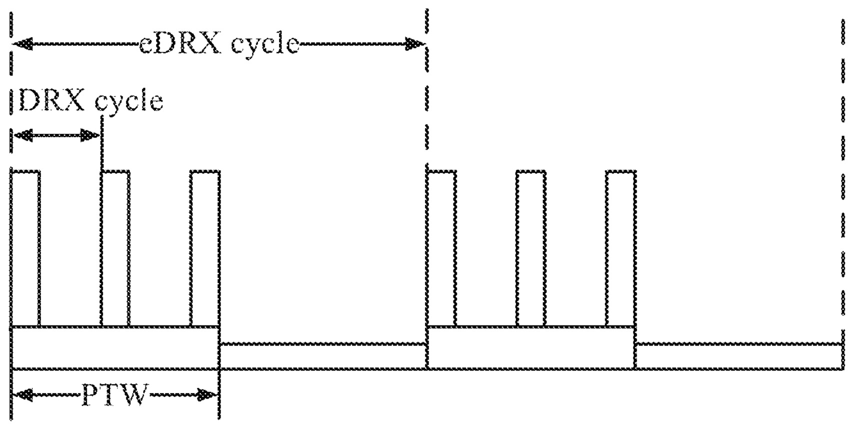
FIG. 4 is a schematic diagram of an eDRX cycle.

FIG. 4 is a schematic diagram of an eDRX cycle. As shown in FIG. 4, the terminal device monitors the paging channel in the paging time window (PTW) according to the DRX cycles, in order to receive downlink data (or services); and in the time out of the PTW, the terminal device is in a sleep state, i.e. not monitoring the paging channel and cannot receive downlink data (or services).

Positioning in DRX Modes

When the terminal device is in the sleep state, it may perform positioning by sending non-periodic SRS or measuring PRS. In this way, waking up the terminal device from the sleep state during positioning is a key component of power consumption in the positioning process.

According to the current protocols, the DRX mode and uplink/downlink positioning are designed independently of each other. In other words, currently, the positioning process of a communication system does not take energy saving into account. The independent design of the DRX mode and positioning measurement may cause power consumption issues. Therefore, how to coordinate the DRX mode and positioning measurement is an urgent problem to be solved.

To this end, the embodiments of the present disclosure aim to reduce the time difference between positioning measurement and paging monitoring (paging sensing) to reduce the number of sleep transitions of terminal devices, thereby reducing the power consumption of terminal devices. For example, the embodiments of the present disclosure can minimize the time between PRS measurement/SRS transmission and paging monitoring to reduce the number of sleep transitions, thereby reducing the resulting power consumption.

In some embodiments, in order to reduce the time difference between positioning measurement and paging monitoring, and to minimize the number of sleep transitions of terminal devices, DRX may be aligned with the reference signal for positioning (the first signal mentioned below). That is to say, the embodiments of the present disclosure take both DRX and the configuration of the reference signal for positioning into account, aiming to minimize the number of sleep transitions of terminal devices by allowing that the transmission/measurement of the reference signal for positioning occurs in the active time of DRX.

There are various ways to align DRX with the reference signal for positioning. In some embodiments, the reference signal for positioning may be fixed, and DRX may be configured in the interval corresponding to the reference signal for positioning. For example, the transmission/measurement period of the reference signal for positioning may be fixed. In the DRX configuration process, the DRX cycle may be configured based on the transmission/measurement period of the reference signal for positioning, so that the transmission/measurement of the reference signal for positioning occurs in the active time of DRX. In some other embodiments, DRX may be fixed and the reference signal for positioning may be configured in the interval corresponding to DRX. For example, the configuration of DRX cycle may be fixed. In the process of configuring the reference signal for positioning, the transmission/measurement period of the reference signal for positioning may be configured according to the DRX cycle, so that the transmission/measurement of the reference signal for positioning occurs in the active time of DRX.

In the DRX configuration process, DRX parameters (such as DRX cycle) are configured based on the requirements of power consumption and paging delay. For example, for the RRC_IDLE state and the RRC_INACTIVE state, the terminal device needs to monitor the paging occasion (PO) in each DRX cycle. Therefore, the configuration of DRX cycle needs to take the requirements of paging delay into account. Alternatively, in order to further reduce the power consumption of the terminal device, eDRX may be configured for the terminal device for example using upper layer signaling or RRC signaling. From this perspective, the eDRX cycle shall not be greatly adjusted for positioning purposes. In addition, when the terminal device is in the RRC_IDLE state and/or the RRC_INACTIVE state, the positions of the paging occasions are related to the identification of the terminal device (UE_ID), and the paging occasions also shall not be greatly adjusted. Thus, fixing the reference signal for positioning and configuring DRX in the interval corresponding to the reference signal for positioning become difficult or impractical.

Therefore, in the embodiments of the present disclosure, DRX is fixed and the reference signal for positioning is configured in the interval corresponding to DRX. For example, considering the alignment of the reference signal for positioning with DRX, the embodiments of the present disclosure may adopt an on-demand configuration process to change the configuration of the reference signal for positioning (such as adjusting the period and time-domain offset of the reference signal for positioning), so that the reference signal for positioning is aligned with DRX. Taking the reference signal for positioning being PRS as an example, for aligning PRS with fixed DRX, an on-demand PRS process may be adopted to change PRS configuration (such as adjusting the period and time-domain offset of PRS) to align PRS with DRX.

In the following, the technical solutions of the embodiments of the present disclosure will be illustrated in detail.

Figure 5:
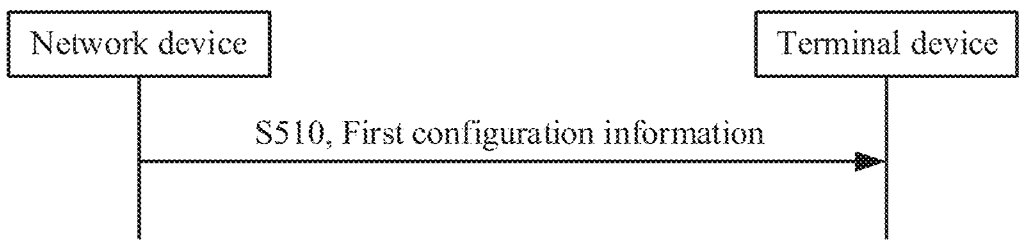
FIG. 5 is a flowchart of a wireless communication method provided in some embodiments of the present disclosure.

FIG. 5 is a flowchart of a wireless communication method provided in some embodiments of the present disclosure. The method shown in FIG. 5 is illustrated from the perspective of interaction between the terminal device and the network device. For example, the terminal device and network device may be the terminal device 120 and network device 110 shown in FIG. 1, respectively. The method shown in FIG. 5 may include operation S510, which will be illustrated below.

At S510, the terminal device receives first configuration information. In some embodiments, the first configuration information may be sent from the network device to the terminal device, but the embodiments of the present disclosure are not limited to this. In some embodiments, the first configuration information may also be sent by for example a positioning device (such as LMF).

The first configuration information may be configured to configure the first signal, in other words, the first configuration information may be configured to determine the configuration parameters of the first signal. The first signal is a signal configured for positioning (or positioning terminal devices). In some embodiments, the first signal may be a reference signal (or pilot signal), for example, the first signal may be a positioning reference signal or a positioning pilot signal.

It is noted that the reference signal for positioning may include one or more of: uplink positioning reference signal, downlink positioning reference signal, and sidelink positioning reference signal. The uplink positioning reference signal may for example include SRS. The downlink positioning reference signal may for example include DL PRS. The sidelink positioning reference signal may for example include SL PRS. The specific type of the first signal is not limited in the embodiments of the present disclosure, as long as it is a reference signal able to achieve positioning. For example, the first signal may be an SRS, such as periodic SRS and/or non-periodic SRS. For example, the first signal may be a PRS, such as one or more of the following: periodic PRS, non-periodic PRS, on-demand PRS.

It should be understood that the PRS mentioned in the embodiments of the present disclosure may refer to DL PRS and/or SL PRS, and the embodiments of the present disclosure are not limited to this. For example, the first signal being PRS may refer to that the first signal is DL PRS or SL PRS.

In the embodiments of the present disclosure, the first configuration information is determined based on DRX parameters (also known as DRX configurations) of the terminal device. In other words, the first configuration information is associated with the DRX of the terminal device, that is, the determination of the first configuration information is associated with the DRX of the terminal device. The embodiments of the present disclosure take the DRX parameters of the terminal device into account when configuring the first signal, which is beneficial for preventing the terminal device from waking up from the sleep state and sending the first signal, thereby reducing the number of sleep transitions of the terminal device, and therefore reducing the power consumption of the terminal device.

The specific content of the first configuration information is not limited in the embodiments of the present disclosure, and the first configuration information may be any information configured to configure the first signal. For example, the first configuration information may include one or more of: time-domain related parameters configured to configure the first signal, frequency-domain related parameters configured to configure the first signal, code-domain related parameters configured to configure the first signal, spatial-domain related parameters configured to configure the first signal, or the like.

Considering that in the embodiments of the present disclosure, aligning the first signal with DRX mainly involves aligning in the time domain, in the following, the first configuration information is illustrated more specifically, taking the first configuration information being time-domain related parameters configured to configure the first signal as an example.

In some embodiments, when the first configuration information is time-domain related parameters configured to configure the first signal, the first configuration information may be configured to configure one or more of: a transmission/measurement period of the first signal, a transmission position of the first signal, and a transmission window of the first signal.

The transmission/measurement period of the first signal may be configured to indicate the period of sending/measuring the first signal. Taking the first signal being on-demand PRS as an example, the transmission/measurement period of the first signal may refer to the period of the on-demand PRS. Taking the first signal being an uplink positioning reference signal as an example, the transmission/measurement period of the first signal may refer to the period of sending the first signal (such as SRS). Taking the first signal being a downlink positioning reference signal as an example, the transmission/measurement period of the first signal may refer to the period of measuring the first signal (such as DL PRS).

The transmission position of the first signal may refer to the time-domain transmission position of the first signal. For example, the transmission position of the first signal may be used to indicate the time of sending the first signal or the time of measuring the first signal. For example, taking the first signal being an uplink positioning reference signal as an example, the transmission position of the first signal may refer to the time of sending the first signal (such as SRS). Alternatively, taking the first signal being a downlink reference signal as an example, the transmission position of the first signal may refer to the time of measuring the first signal (such as DL PRS).

In some embodiments, the transmission position of the first signal may be indicated using specific parameters. For example, the transmission position of the first signal may be indicated using the starting position (starting time) and duration of the first signal. For example, the transmission position of the first signal may refer to a serial number of a time-domain symbol of a time slot at which transmission of the first signal starts, as well as the number of time-domain symbols of the time slot occupied by the transmission of the first signal.

In some embodiments, the transmission position of the first signal may be indicated using relative values. For example, using a relative value configured relative to DRX parameters. As an example, the transmission position of the first signal may be indicated using a time-domain offset of the first signal, the time-domain offset may be determined based on the DRX parameters. For example, when the time-domain offset of the first signal is 3 time-domain symbols after the DRX active time (the starting time of entering the DRX wake-up state), the terminal device may determine that the time of sending/measuring the first signal is the time corresponding to 3 time-domain symbols after the DRX active time.

The transmission window of the first signal refers to the window configured for the first signal, within which the first signal may be transmitted, and the first signal is not transmitted outside the configured window.

In some embodiments, the first signal is periodically transmitted within the transmission window of the first signal. In some embodiments, the period of the first signal transmitted within the transmission window of the first signal may also be configured based on the first configuration information.

In some embodiments, the transmission window of the first signal may be periodically configured. That is to say, the transmission window of the first signal may be configured periodically.

In some embodiments, when the transmission window of the first signal is periodically configured and the first signal is periodically transmitted within the transmission window of the first signal, the first configuration information may be used to configure two period values, one is the period of the transmission window of the first signal, and the other is the period of transmitting the first signal within the transmission window of the first signal.

In some embodiments, the first configuration information may be used to configure the transmission number for the transmission windows of the first signal, so that the terminal device can get to know how many transmission windows are provided for sending the first signal or how many transmission windows are provided for measuring the first signal.

In some embodiments, the period of the transmission window of the first signal is different from the period of sending the first signal within the transmission window of the first signal. For example, the period of the transmission window of the first signal may be greater than the period of sending the first signal within the transmission window of the first signal. In this way, the first signal can be sent multiple times within the transmission window of the first signal, which is beneficial for reducing positioning delay or improving positioning accuracy.

Figure 6:
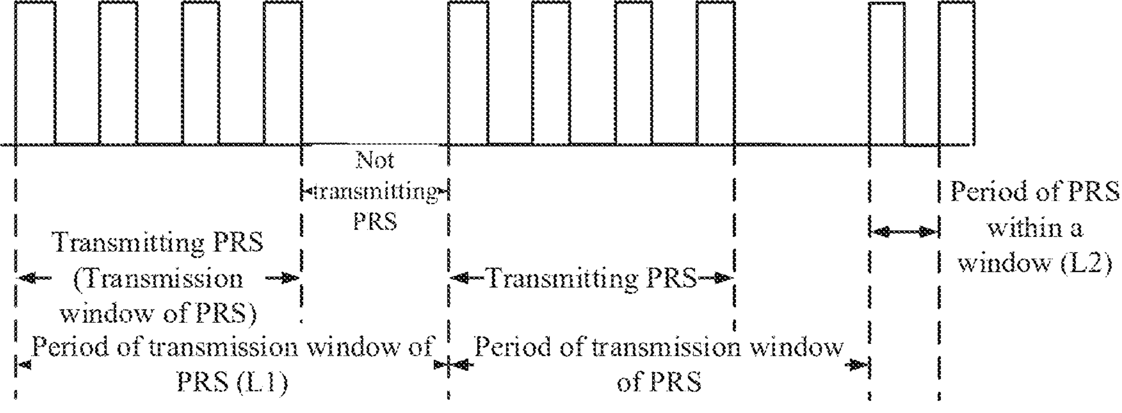
FIG. 6 shows an example of a transmission window of the first signal provided in some embodiments of the present disclosure.

For ease of understanding, an example of the transmission window of the first signal is given below in conjunction with FIG. 6. In the example shown in FIG. 6, the first signal is a PRS. As shown in FIG. 6, within a period (having a period length of L1) of the transmission window of the PRS, the PRS is periodically transmitted in the transmission window of the PRS, and outside the transmission window of the PRS, no PRS is sent. In addition, in the example shown in FIG. 6, a period (having a period length of L2) of sending the PRS within the transmission window of the PRS is less than the period of the transmission window of the PRS.

In some embodiments, the parameters relevant to the transmission window of the first signal may be indicated using specific parameters. For example, the period of the transmission window of the first signal, the period of sending the first signal within the transmission window of the first signal, and the like, may be indicated using specific parameters.

In some embodiments, the parameters relevant to the transmission window of the first signal may be indicated using relative values. For example, the period of the transmission window of the first signal, the period of sending the first signal within the transmission window of the first signal, and the like, may be configured with relative values using DRX parameters. As an example, the period of the transmission window of the first signal may be indicated using the offset relative to the DRX cycle. As another example, the period of transmitting the first signal within the transmission window of the first signal may be indicated using the offset relative to the DRX period.

In some embodiments, when the parameters relevant to the transmission window of the first signal are indicated using relative values, the offset for the period of transmitting the first signal within the transmission window of the first signal may be different from the offset for the period of the transmission window of the first signal. That is to say, different offsets may be used for the transmission window of the first signal and the first signal transmitted within the transmission window of the first signal. For example, the offset for the period of transmitting the first signal within the transmission window of the first signal and the offset for the period of the transmission window of the first signal are both relative to the DRX cycle, and these two offsets relative to the DRX cycle are different from each other.

In the embodiments of the present disclosure, the first signal is a reference signal for positioning. In some embodiments, the first configuration information may be used to configure other parameters related to positioning measurements in addition to configuring the first signal. For example, in addition to configuring the time-domain related parameters of the first signal, the first configuration information may further be used to configure one or more of: positioning measurement parameters of the terminal device, and parameters relevant to the positioning measurement gap of the terminal device.

The embodiments of the present disclosure do not specifically limit the positioning measurement parameters of the terminal device, as long as they are parameters related to the positioning measurement of the terminal device. For example, the positioning measurement parameters of the terminal device may include relevant parameters of the measurement method adopted by the terminal device, such as DL-AoA measurement parameters, DL-AoD measurement parameters, and the like. The positioning measurement parameters of the terminal device may include parameters relevant to the measurement quantities of the positioning measurement by the terminal device, such as RSRP, time differences between reference signals for different cells, relative arrival time of reference signals received by the terminal device, ADOA of reference signals received by the terminal device, and the like.

The embodiments of the present disclosure do not specifically limit the parameters relevant to the positioning measurement gap of the terminal device, as long as they are able to be used to determine the positioning measurement gap. For example, the parameters relevant to the positioning measurement gap of the terminal device may include the positioning measurement gaps of the terminal device, the initial offsets of the positioning measurement gaps, the repetition period of the positioning measurement gaps, or the like.

The embodiments of the present disclosure do not specifically limit the content of the DRX parameters (DRX configurations), and the DRX parameters may be any parameters associated with the DRX of the terminal device. For example, DRX parameters may include one or more of: DRX related time-domain parameters, DRX related frequency-domain parameters, DRX related code-domain parameters, DRX related spatial-domain parameters, and the like.

Considering that in the embodiments of the present disclosure, aligning the first signal with DRX mainly involves aligning in the time domain, in the following, the DRX parameters are illustrated exemplarily, taking the determination of the first configuration information being mainly associated with the time-domain parameters of DRX as an example.

The embodiments of the present disclosure do not limit the time-domain parameters of DRX. For example, DRX parameters may include DRX cycle, DRX active time (DRX wake-up time), duration of the DRX-on duration timer, duration of the DRX-inactivity timer, duration of the DRX-short cycle timer, duration of the DRX-retransmission timer DL, and the like.

On the basis of the above illustration of the content of the first configuration information and DRX parameters (or DRX configurations), in the following, how the first configuration information is determined based on DRX parameters is exemplarily illustrated.

In some embodiments, the first configuration information may be associated with the RRC states of the terminal device. In other words, the first configuration information may be configured based on the RRC states of the terminal device. That is to say, in the embodiments of the present disclosure, different first configuration information may be configured for the terminal device according to different RRC states. The RRC states of the terminal device may include one or more of: an RRC_CONNECTED state, an RRC_IDLE state, and an RRC_INACTIVE state.

In some embodiments, the transmission/measurement period of the first signal may be configured based on the RRC states of the terminal device. For example, when the terminal device is in the RRC_CONNECTED state, the sleep time of the terminal device is relatively short, so the transmission/measurement period of the first signal may be configured to be relatively short. When the terminal device is in the RRC_IDLE state and/or the RRC_INACTIVE state, the sleep time of the terminal device is relatively long, so the transmission/measurement period of the first signal may be configured to be relatively long.

In some embodiments, the transmission/measurement period of the first signal is in correspondence to a DRX cycle of the terminal device. That is to say, the transmission/measurement period of the first signal is configured based on the DRX cycle of the terminal device. For example, the transmission/measurement period of the first signal may be the same as and correspond to the DRX cycle of the terminal device (or, the transmission/measurement period of the first signal may be synchronized with the DRX cycle of the terminal device). As an example, the transmission/measurement period of the first signal may include the duration in which the first signal is transmitted/measured and the duration in which the first signal is not transmitted/measured. The duration in which the first signal is transmitted/measured may correspond to the DRX active time, and the duration in which the first signal is not transmitted/measured may correspond to the DRX sleep time.

In some embodiments, the duration in which the first signal is transmitted/measured being in correspondence to the DRX active time may refer to that the duration in which the first signal is transmitted/measured is the same as the DRX active time, and the duration in which the first signal is not transmitted/measured being in correspondence to the DRX sleep time may refer to that the duration in which the first signal is not transmitted/measured may be the same as the DRX sleep time.

In some embodiments, the duration in which the first signal is transmitted/measured being in correspondence to the DRX active time may refer to that the duration in which the first signal is transmitted/measured is within the DRX active time.

In some embodiments, the transmission/measurement period of the first signal is configured based on the RRC states of the terminal device, and the transmission/measurement period of the first signal is in correspondence to the DRX cycle of the terminal device, in this way, the transmission/measurement period of the first signal is consistent with the DRX cycle of the terminal device, which is beneficial for reducing the number of wake-up times of the terminal device.

In some embodiments, a transmission/measurement period of the first signal corresponding to the RRC_CONNECTED state of the terminal device is shorter than a transmission/measurement period of the first signal corresponding to the RRC_IDLE state/the RRC_INACTIVE state of the terminal device.

In some embodiments, the synchronization of the transmission/measurement period of the first signal with the DRX cycle is indicated by the network device. In some embodiments, the synchronization of the transmission/measurement period of the first signal with the DRX cycle is predefined in protocols.

In some embodiments, the transmission position of the first signal is configured based on the RRC states of the terminal device. For example, the transmission position of the configured first signal may vary with the RRC states of the terminal device. As an example, when the terminal device is in the RRC_CONNECTED state, the transmission position of the configured first signal is a first position, when the terminal device is in the RRC_IDLE state and/or the RRC_INACTIVE state, the transmission position of the configured first signal is a second position, and the second position may be different from the first position.

In some embodiments, the transmission position (time-domain position) of the first signal is in correspondence to the DRX cycle of the terminal device. That is to say, the transmission position of the first signal is configured according to the DRX cycle of the terminal device. For example, the transmission position of the first signal may be configured within the DRX active time.

In other words, in some embodiments, the network device may configure different parameters of the first signal for the terminal device in different RRC states (i.e., the values of the parameters of the first configuration information may vary). For example, the transmission/measurement period and the transmission position of the first signal configured for the terminal device may vary with the RRC states of the terminal device, as mentioned above. For ease of understanding, in the following example, the parameters such as period and time-domain offset of the first signal configured by the network device for the terminal device in different RRC states vary. The first signal may be a PRS (such as on-demand PRS, periodic PRS, or the like) or an SRS.

The network device may configure different parameters of the first signal for the terminal device according to the RRC states of the terminal device, such as the period and time-domain offset of the first signal. In some embodiments, these parameters such as period and time-domain offset may be pre-configured for the terminal device. Subsequently, the terminal device may use different parameters for PRS transmission/measurement based on the RRC states. As an example, the network device pre-configures the terminal device with the period and/or time-domain offset corresponding to the RRC_CONNECTED state, as well as the periods and/or time-domain offsets corresponding to the RRC_IDLE state/RRC_INACTIVE state. After receiving the configuration information, when the terminal device is in the RRC_CONNECTED state, the terminal device may send/measure the first signal based on the period and time-domain offset corresponding to the RRC_CONNECTED state. When the terminal device is in the RRC_IDLE state/RRC_INACTIVE state, the terminal device may send/measure the first signal based on the periods and time-domain offsets corresponding to the RRC_IDLE state/RRC_INACTIVE state.

In some embodiments, the transmission window of the first signal is configured based on the DRX parameters of the terminal device. For example, the transmission window of the first signal may be a relative value configured based on the DRX parameters of the terminal device, but the embodiments of the present disclosure are not limited to this. The transmission window of the first signal may also be a specific and configured parameter value, which is determined based on the DRX parameters of the terminal device.

In some embodiments, the transmission window of the first signal may correspond to the DRX active time of the terminal device. For example, the transmission window of the first signal may be synchronized with (the same as) the DRX active time of the terminal device. Alternatively, the transmission window of the first signal may be configured within the DRX active time of the terminal device.

In some embodiments, when the transmission window of the first signal is configured periodically, the period of the transmission window of the first signal may correspond to the DRX cycle (paging cycle) of the terminal device. For example, the period of the transmission window of the first signal may be synchronized with (the same as) the DRX cycle of the terminal device.

It should be understood that due to the high resource occupancy of the first signal (such as PRS), the positioning measurement of the terminal device may not be completed using a first signal transmitted in a continuous duration, and it is also necessary to transmit/measure the first signal in a next time period after a period of time. Therefore, in some embodiments, a plurality of resources need to be configured at intervals for the terminal device to transmit/measure the first signal. In this case, as an implementation, a periodic first signal may be configured near the DRX active time (such as within the DRX active time), or no transmission/measurement of the first signal is performed out of the DRX active time. In this way, it is beneficial to ensure that positioning measurements occur as much as possible in the DRX active time, thereby reducing the number of waking up of the terminal device, and reducing the power consumption of the terminal device.

In some embodiments, first configuration information corresponding to the RRC_IDLE state of the terminal device is identical to first configuration information corresponding to the RRC_INACTIVE state of the terminal device. For example, for the transmission/measurement period of the first signal, the configuration of the transmission/measurement period of the first signal is the same when the terminal device is in the RRC_IDLE state and the RRC_INACTIVE state. Alternatively, for the transmission position of the first signal (such as time-domain offset), the configuration of the transmission position of the first signal is the same when the terminal device is in the RRC_IDLE state and the RRC_INACTIVE state.

In some embodiments, first configuration information corresponding to the RRC_IDLE state of the terminal device may be at least partially different from first configuration information corresponding to the RRC_INACTIVE state of the terminal device. As an example, for the transmission/measurement period and transmission position (such as time-domain offset) of the first signal, the configuration of the transmission/measurement period of the first signal and the configuration of the transmission position of the first signal corresponding to the RRC_IDLE state of the terminal device are respectively different from those corresponding to the RRC_INACTIVE state of the terminal device. As another example, for the transmission/measurement period of the first signal and the transmission position (such as time-domain offset) of the first signal, the configuration of the transmission/measurement period of the first signal corresponding to the RRC_IDLE state of the terminal device may be the same as the configuration of the transmission/measurement period of the first signal corresponding to the RRC_INACTIVE state of the terminal device, and the configuration of the transmission position of the first signal corresponding to the RRC_IDLE state of the terminal device may be different from the configuration of the transmission position of the first signal corresponding to the RRC_INACTIVE state of the terminal device; or the configuration of the transmission/measurement period of the first signal corresponding to the RRC_IDLE state of the terminal device may be different from the configuration of the transmission/measurement period of the first signal corresponding to the RRC_INACTIVE state of the terminal device, and the configuration of the transmission position of the first signal corresponding to the RRC_IDLE state of the terminal device may be the same as the configuration of the transmission position of the first signal corresponding to the RRC_INACTIVE state of the terminal device.

In some embodiments, the terminal device may determine whether the first configuration information is associated with the DRX parameters according to an indication from the network device. In other words, the terminal device may determine whether the first configuration information is determined based on the DRX parameters according to the indication from the network device. This will be illustrated below in conjunction with FIG. 7.

Figure 7:
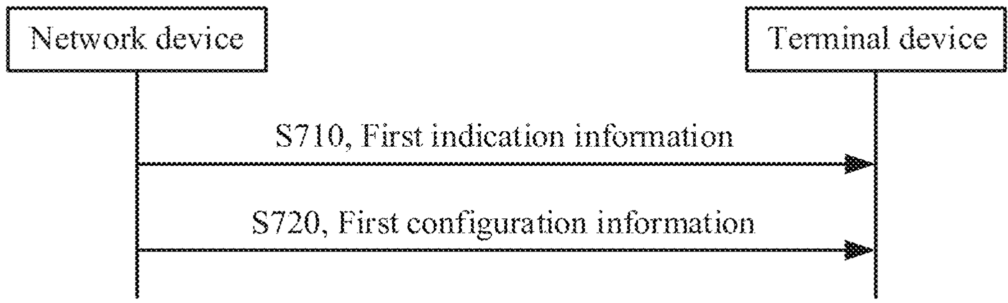
FIG. 7 is a flowchart of another wireless communication method provided in some embodiments of the present disclosure.

FIG. 7 is a flowchart of another wireless communication method provided in some embodiments of the present disclosure. The method shown in FIG. 7 may include operations S710 and S720, which will be illustrated below.

At S710, a terminal device receives first indication information configured for the terminal device to determine whether the first configuration information is associated with (relevant to) the DRX parameters.

In some embodiments, the first indication information includes one or more of: whether the first signal is determined based on the DRX parameters of the terminal device, whether positioning measurement of the terminal device is determined based on the DRX parameters of the terminal device, and whether measurement gaps for the positioning measurement of the terminal device are determined based on the DRX parameters of the terminal device.

In some embodiments, the first indication information may be sent to the terminal device by the network device.

The terminal device can determine whether the first configuration information is associated with the DRX parameters using the first indication information, which is beneficial for the terminal device to determine the first configuration information based on the DRX parameters.

At S720, the terminal device receives the first configuration information configured to configure the first signal, the first signal is a reference signal for positioning.

Reference may be made to the above illustration of the operation S510 for the illustration of the operation S720. For simplicity, it will not be repeated here.

The embodiments of the present disclosure do not limit the performing order of the operations S710 and S720. For example, the operation S710 may be performed before or after the operation S720, or be performed simultaneously with the operation S720.

The embodiments of the present disclosure do not limit the bearer of the first configuration information. In the following, the bearer of the first configuration information is illustrated exemplarily.

In some embodiments, the first configuration information may be carried in high-level signaling (such as RRC related signaling). In some embodiments, the first configuration information may be carried in system information. In some embodiments, the first configuration information may be carried in a non-access stratum (NAS) message. In some embodiments, the first configuration information may be carried in the interactive signaling related to positioning measurement.

Exemplarily, the first configuration information may be carried by one or more of: a system information block (SIB), an RRC release message received by the terminal device in response to the terminal device entering the RRC_INACTIVE state, a NAS message, positioning assistance information received by the terminal device during positioning measurement of the terminal device, and the RRC release message received by the terminal device during the positioning measurement of the terminal device.

In some embodiments, the first configuration information and the DRX parameters of the terminal device may be carried in the same signaling. For example, the first configuration information is sent in the signaling carrying the DRX parameters (DRX configurations). Exemplarily, the first configuration information may be carried in an SIB together with the DRX parameters, or the first configuration information may be carried in an RRC release message together with the DRX parameters.

The embodiments of the present disclosure do not limit the SIB that carries the first configuration information. For example, the first configuration information may be carried in SIB1, or the first configuration information may be carried in an SIB other than SIB1.

In some embodiments, the first configuration information and/or DRX configurations may be carried on the paging control channel (PCCH) in SIB1. In some embodiments, this bearer may be applicable when the terminal device is in the RRC_IDLE state and the RRC_INACTIVE state.

In some embodiments, the first configuration information may be carried in the RRC release message received by the terminal device in response to the terminal device entering the RRC_INACTIVE state. For example, when the terminal device enters the RRC_INACTIVE state, the first configuration information may be carried in the PCCH configuration in the RRC release message. In some embodiments, this bearer may be applicable when the terminal device is in the RRC_INACTIVE state.

In some embodiments, before the terminal device enters the RRC_INACTIVE state, the network device may send the DRX configurations to the terminal device using the RRC release message and notify the terminal device of the first configuration information (for example, the first configuration information corresponding to various RRC states of the terminal device).

In some embodiments, the first configuration information may be carried in the NAS message. For example, when the terminal device is in the RRC_CONNECTED state, the terminal device may receive NAS messages corresponding to the RRC_IDLE state and/or the RRC_INACTIVE state to determine the first configuration information using the NAS messages.

In some embodiments, when the terminal device is in the RRC_CONNECTED state, the network device may send the DRX configurations to the terminal device using NAS messages or SIBs (such as SIB1). When configuring DRX using NAS messages, the network device may notify the terminal device of the first configuration information (for example, the first configuration information corresponding to various RRC states of the terminal device). As an example, when configuring DRX using NAS messages, the network device may notify the offsets of the transmission positions of the first signal relative to a certain position of DRX (such as the time set by the DRX-on duration timer) corresponding to various RRC states. As another example, when configuring DRX using NAS messages, the network device may notify the transmission/measurement period of the first signal corresponding to various RRC states.

In some embodiments, the first configuration information and/or the DRX configurations carried in the RRC release message received by the terminal device in response to the terminal device entering the RRC_INACTIVE state and the NAS message are configured in a way specific to the terminal device, and the first configuration information and/or the DRX configurations carried in SIBs (such as SIB1) are applicable to all terminal devices in the entire cell and may not be suitable for being adjusted for the energy saving of individual terminal devices.

Figures 8, 9:
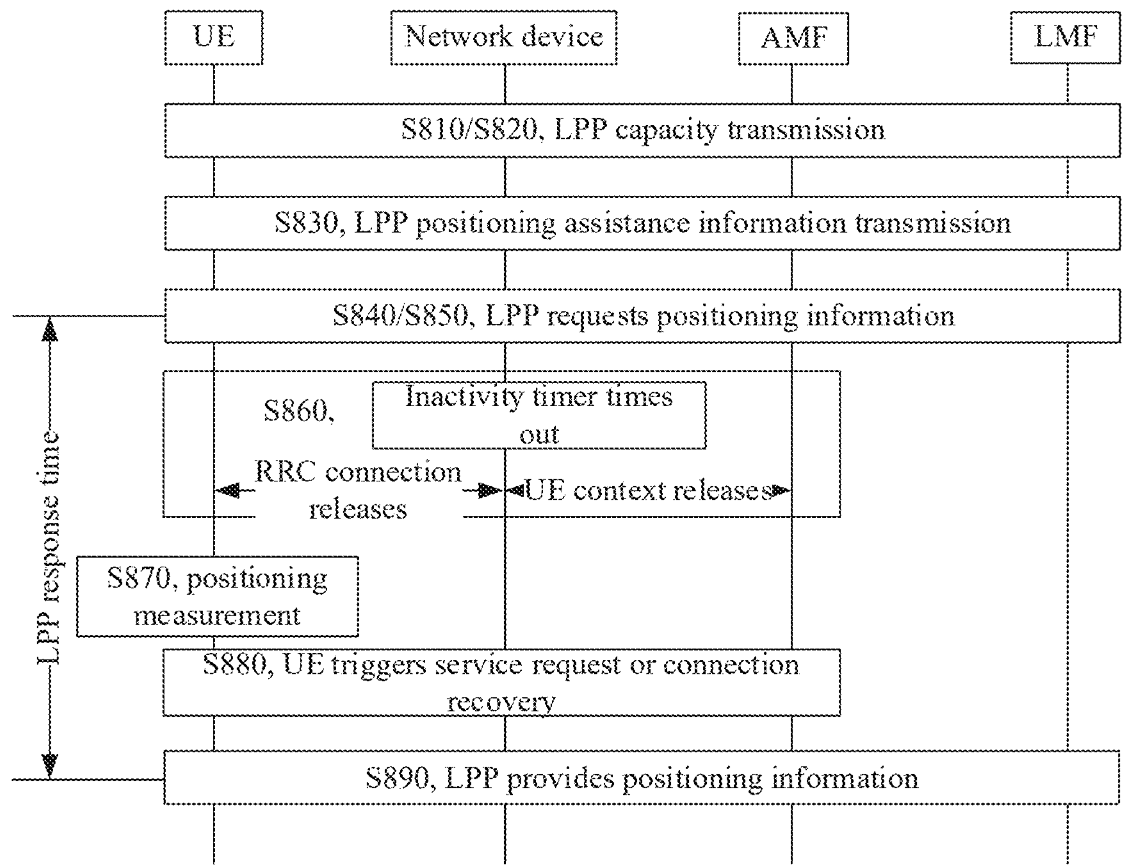
FIG. 8 is a flowchart of a positioning measurement process of the terminal device.
FIG. 9 is a schematic diagram of a structure of the terminal device provided in some embodiments of the present disclosure.

In some embodiments, the first configuration information may be carried in the interactive signaling related to positioning measurement. FIG. 8 shows a schematic diagram of the positioning measurement process of the terminal device in the RRC_IDLE state. In the embodiments of the present disclosure, the first configuration information may for example be carried in the positioning assistance information (as shown in operation S830 in FIG. 8); or the first configuration information may be carried in the RRC release message (as shown in operation S860 in FIG. 8). However, the embodiments of the present disclosure are not limited to this, and the first configuration information may also be carried in other signaling related to positioning measurement, such as newly added interactive signaling in the positioning measurement process, the newly added interactive signaling is used to carry the first configuration information, and the like.

For ease of understanding, in the following, several examples are provided. The following examples are illustrated taking the first signal being a PRS as an example, and it should be understood that the examples are not intended to limit the technical solution of the present disclosure.

It is noted that the following examples may be combined arbitrarily. For example, Example 1 and Example 2 may be combined, Example 1 and Example 3 may be combined, Example 2 and Example 4 may be combined, Example 1, Example 2, and Example 3 may be combined, and the like.

Example 1: Configuring the Period of PRS Based on the RRC States of the Terminal Device When the terminal device is in the RRC_CONNECTED state, the sleep time of the terminal device is relatively short, so the period of on-demand PRS is relatively short. When the terminal device is in the RRC_IDLE state and/or the RRC_INACTIVE state, the sleep time of the terminal device is relatively long, so the period of PRS is relatively long for the terminal device in the RRC_IDLE state and/or the RRC_INACTIVE state.

The network device may configure different PRS parameters, such as periods or time-domain offsets, for the terminal device in various RRC states. These PRS parameters may be pre-configured for the terminal device, and subsequently, the terminal device may use different PRS parameters to perform PRS transmission/measurement based on various RRC states. For example, the network device pre-configures the terminal device with a period in the RRC_CONNECTED state and a period in the RRC_IDLE state/the RRC_INACTIVE state. The terminal device receives the information, and when the terminal device is in the RRC_CONNECTED state, the terminal device transmits/measures PRS based on the periods and time-domain offsets corresponding to the RRC_CONNECTED state. When the terminal device is in the RRC_IDLE state/the RRC_INACTIVE state, the terminal device transmits/measures PRS based on the periods and time-domain offsets corresponding to the RRC_IDLE state/the RRC_INACTIVE state.

In some embodiments, the network device may configure PRS parameters for the RRC_IDLE state of the terminal device different from those for the RRC_INACTIVE state of the terminal device. For example, periods and time-domain offsets for the RRC_IDLE state each are different from those for the RRC_INACTIVE state.

In some embodiments, the network device may configure PRS parameters for the RRC_IDLE state of the terminal device partially different from those for the RRC_INACTIVE state of the terminal device. For example, the network device configures the same parameters (such as time-domain offsets) for the RRC_IDLE state and for the RRC_INACTIVE state, and configures parameters (such as periods) for the RRC_IDLE state different from those for the RRC_INACTIVE state.

Example 2: Configuring the Periodic Window for PRS Transmission Based on DRX Parameters The periodic window for PRS transmission configured based on DRX parameters may be specific parameter values or relative values configured based on the DRX parameters (the relative values relative to a certain parameter of DRX).

In some embodiments, due to the high resource occupancy of PRS, the positioning measurement may not be completed using PRS transmitted in a continuous duration, and it is also necessary to measure the PRS in a next time period after a period of time. Therefore, a plurality of PRS resources need to be configured at intervals. In some embodiments, a periodic PRS may be configured near the DRX active time, and no transmission of PRS is performed out of the DRX active time. The relevant configuration of the periodic window for PRS transmission may be found in the above illustration of FIG. 6.

In some embodiments, the configuration of PRS includes two period values: for example, one is the period of the transmission window of PRS, and the other is the period of PRS transmission within the window; or one is the period within PPW, and the other is the period of PRS transmission outside PPW.

In some embodiments, the number of transmission times may be configured for the windows for PRS transmission, that is, configuring the number of windows in which PRSs are to be measured by the terminal device.

In some embodiments, the window for PRS transmission and the transmission of PRS within the window may use time-domain offsets different from each other.

Example 3: Configuring Signaling to Configure PRS in Different States or Windows for PRS Transmission Based on DRX Configurations The terminal device may use DRX to reduce power consumption in the RRC_IDLE state, the RRC_INACTIVE state, and the RRC_CONNECTED state. In the RRC_IDLE state/the RRC_INACTIVE state/the RRC_CONNECTED state, there are following three methods for the network device to configure DRX to the terminal device:

Method 1: using the PCCH configuration in SIB1, applicable to the RRC_IDLE state and the RRC_INACTIVE state;

Method 2: using the PCCH configuration in the RRC release message when the terminal device enters the RRC_INACTIVE state, applicable to the RRC_INACTIVE state; and Method 3: using the NAS messages corresponding to the RRC_IDLE state and/or the RRC_INACTIVE state received by the terminal device when the terminal device is in the RRC_CONNECTED state.

It should be understood that the DRX configurations carried in NAS messages and RRC release messages are specific to the terminal device. For the configurations carried in SIB1, they are applicable to all terminal devices in a cell and are therefore not suitable for being adjusted for the energy saving of individual terminal devices.

In some embodiments, the network device may send the first configuration information (PRS parameters) to the terminal device in the manners as follows.

Manner 1: When the terminal device is in the RRC_CONNECTED state, the network device sends DRX configurations to the terminal device using NAS messages or SIB1; and when configuring DRX using NAS messages, the terminal device may be notified of the PRS parameters corresponding to the RRC_IDLE state, the RRC_INACTIVE state, and the RRC_CONNECTED state, such as the offset of PRS relative to a certain position of DRX (for example the time set by the DRX-on duration timer); and Manner 2: Before the terminal device enters the RRC_INACTIVE state, the network device sends DRX configurations to the terminal device using RRC release message, notifying the terminal device of PRS parameters corresponding to the RRC_IDLE state, the RRC_INACTIVE state, and the RRC_CONNECTED state.

Example 4: Configuring Signaling to Configure in a Positioning Process

Referring to FIG. 8, when performing LPP assisted data transmission (operation S830), the network device may notify the terminal device of PRS parameters for different RRC states. Alternatively, when the network device sends an RRC release message to the terminal device (operation S860), the network device may notify PRS parameters for different RRC states.

The method embodiments of the present disclosure are illustrated in detail above with reference to FIGS. 1 to 8. The device embodiments of the present disclosure will be illustrated in detail below with reference to FIGS. 9 to 11. It should be understood that the illustration of the method embodiments is in correspondence to the illustration of the device embodiments, therefore, the parts not illustrated in detail may refer to the method embodiments as illustrated above.

FIG. 9 is a schematic diagram of a structure of the terminal device provided in some embodiments of the present disclosure. The terminal device 900 shown in FIG. 9 may include a first reception unit 910.

The first reception unit 910 may be configured to receive first configuration information, where the first configuration information is configured to configure a first signal, and the first signal is a reference signal for positioning. The first configuration information is determined based on DRX parameters of the terminal device.

In some embodiments, the first configuration information is configured to configure one or more of: a transmission/measurement period of the first signal, a transmission position of the first signal, a transmission window of the first signal, positioning measurement parameters of the terminal device, and parameters of positioning measurement gaps of the terminal device.

In some embodiments, at least one of the transmission/measurement period of the first signal and the transmission position of the first signal is configured based on an RRC state of the terminal device, and at least one of the transmission/measurement period of the first signal and the transmission position of the first signal is in correspondence to a DRX cycle of the terminal device.

In some embodiments, a transmission/measurement period of the first signal corresponding to an RRC_CONNECTED state of the terminal device is shorter than a transmission/measurement period of the first signal corresponding to at least one of an RRC_IDLE state and an RRC_INACTIVE state of the terminal device.

In some embodiments, the transmission position of the first signal is indicated by a time-domain offset of the first signal, and the time-domain offset is determined based on the DRX parameters of the terminal device.

In some embodiments, the transmission window of the first signal is a relative value configured based on the DRX parameters of the terminal device.

In some embodiments, the transmission window of the first signal is configured within DRX active time of the terminal device.

In some embodiments, in the transmission window of the first signal, the first signal is periodically transmitted.

In some embodiments, an offset for a period of sending the first signal in the transmission window of the first signal is different from an offset for a period of the transmission window of the first signal.

In some embodiments, the first configuration information is associated with RRC states of the terminal device, and the RRC states of the terminal device include at least one of: an RRC_CONNECTED state, an RRC_IDLE state, and an RRC_INACTIVE state.

In some embodiments, first configuration information corresponding to an RRC_IDLE state of the terminal device is identical to first configuration information corresponding to an RRC_INACTIVE state of the terminal device; or first configuration information corresponding to an RRC_IDLE state of the terminal device is at least partially different from first configuration information corresponding to an RRC_INACTIVE state of the terminal device.

In some embodiments, the terminal device further includes a second reception unit 920 configured to receive first indication information. The first indication information is configured for the terminal device to determine whether the first configuration information is associated with the DRX parameters of the terminal device.

In some embodiments, the first indication information includes one or more of: whether the first signal is determined based on the DRX parameters of the terminal device, whether positioning measurement of the terminal device is determined based on the DRX parameters of the terminal device, and whether measurement gaps for the positioning measurement of the terminal device are determined based on the DRX parameters of the terminal device.

In some embodiments, the first configuration information is carried by one or more of: a system information block, an RRC release message received by the terminal device in response to the terminal device entering an RRC_INACTIVE state, a non-access stratum message, positioning assistance information received by the terminal device during positioning measurement of the terminal device, and the RRC release message received by the terminal device during the positioning measurement of the terminal device.

In some embodiments, the first signal includes one or more of: an on-demand PRS, a periodic PRS, a non-periodic PRS, a non-periodic SRS, and a periodic SRS.

Figure 11:
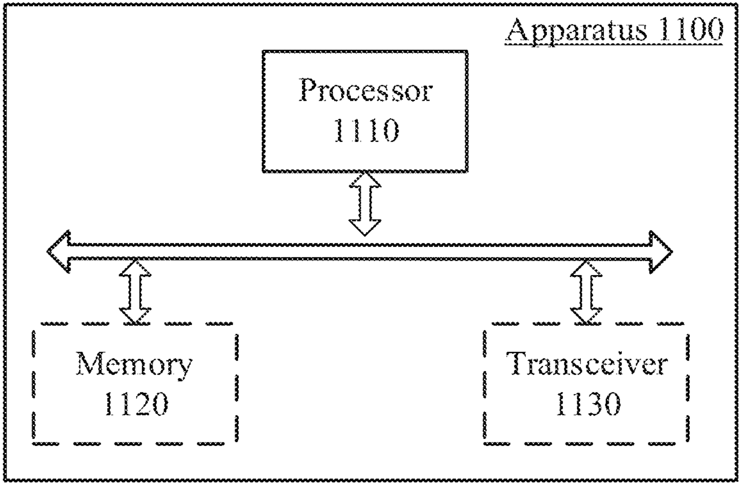
FIG. 11 is a schematic diagram of a structure of the communication apparatus provided in some embodiments of the present disclosure.

In some embodiments, the first reception unit 910 may be implemented as a transceiver 1130. The terminal device 900 may further include a processor 1110 and a memory 1120, as shown in FIG. 11.

Figure 10:
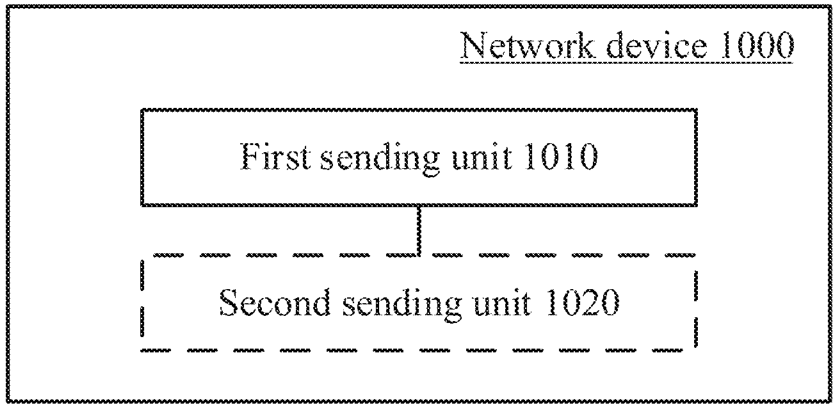
FIG. 10 is a schematic diagram of a structure of the network device provided in some embodiments of the present disclosure.

FIG. 10 is a schematic diagram of a structure of the network device provided in some embodiments of the present disclosure. The network device 1000 as shown in FIG. 10 may include a first sending unit 1010.

The first sending unit 1010 may be configured to send first configuration information to a terminal device. The first configuration information is configured to configure a first signal, and the first signal is a reference signal for positioning. The first configuration information is determined based on DRX parameters of the terminal device.

In some embodiments, the first configuration information is configured to configure one or more of: a transmission/measurement period of the first signal, a transmission position of the first signal, a transmission window of the first signal, positioning measurement parameters of the terminal device, and parameters of positioning measurement gaps of the terminal device.

In some embodiments, at least one of the transmission/measurement period of the first signal and the transmission position of the first signal is configured based on an RRC state of the terminal device, and at least one of the transmission/measurement period of the first signal and the transmission position of the first signal is in correspondence to a DRX cycle of the terminal device.

In some embodiments, a transmission/measurement period of the first signal corresponding to an RRC_CONNECTED state of the terminal device is shorter than a transmission/measurement period of the first signal corresponding to at least one of an RRC_IDLE state and an RRC_INACTIVE state of the terminal device.

In some embodiments, the transmission position of the first signal is indicated by a time-domain offset of the first signal, and the time-domain offset is determined based on the DRX parameters of the terminal device.

In some embodiments, the transmission window of the first signal is a relative value configured based on the DRX parameters of the terminal device.

In some embodiments, the transmission window of the first signal is configured within DRX active time of the terminal device.

In some embodiments, in the transmission window of the first signal, the first signal is periodically transmitted.

In some embodiments, an offset for a period of sending the first signal in the transmission window of the first signal is different from an offset for a period of the transmission window of the first signal.

In some embodiments, the first configuration information is associated with RRC states of the terminal device, and the RRC states of the terminal device include at least one of: an RRC_CONNECTED state, an RRC_IDLE state, and an RRC_INACTIVE state.

In some embodiments, first configuration information corresponding to an RRC_IDLE state of the terminal device is identical to first configuration information corresponding to an RRC_INACTIVE state of the terminal device; or first configuration information corresponding to an RRC_IDLE state of the terminal device is at least partially different from first configuration information corresponding to an RRC_INACTIVE state of the terminal device.

In some embodiments, the network device further includes a second sending unit 1020 configured to send first indication information to the terminal device. The first indication information is configured for the terminal device to determine whether the first configuration information is associated with the DRX parameters of the terminal device.

In some embodiments, the first indication information includes one or more of: whether the first signal is determined based on the DRX parameters of the terminal device, whether positioning measurement of the terminal device is determined based on the DRX parameters of the terminal device, and whether measurement gaps for the positioning measurement of the terminal device are determined based on the DRX parameters of the terminal device.

In some embodiments, the first configuration information is carried by one or more of: a system information block, an RRC release message received by the terminal device in response to the terminal device entering an RRC_INACTIVE state, a non-access stratum message, positioning assistance information received by the terminal device during positioning measurement of the terminal device, and the RRC release message received by the terminal device during the positioning measurement of the terminal device.

In some embodiments, the first signal includes one or more of: an on-demand PRS, a periodic PRS, a non-periodic PRS, a non-periodic SRS, and a periodic SRS.

FIG. 11 is a schematic diagram of a structure of the communication apparatus provided in some embodiments of the present disclosure. The dashed lines in FIG. 11 indicate that the unit or module is optional. The apparatus 1100 may be used to perform the operations of the method as illustrated in the above method embodiments. The apparatus 1100 may be implemented as a chip, a terminal device, or a network device.

The apparatus 1100 may include one or more processors 1110. The one or more processors 1110 can support the apparatus 1100 to implement the method illustrated in the above method embodiments. Each of the one or more processors 1110 may be a general-purpose processor or a special-purpose processor. For example, each of the one or more processors may be a central processing unit (CPU). Alternatively, each of the one or more processors may also be other general-purpose processor, a digital signal processor (DSP), an application specific integrated circuit (ASIC), a field programmable gate array (FPGA), or other programmable logic device, a discrete gate or a transistor logic device, a discrete hardware component, or the like. A general-purpose processor may be a microprocessor or any conventional processor.

The apparatus 1100 may further include one or more memories 1120. Each of the one or more memories 1120 stores a program that can be executed by the one or more processors 1110 so that the one or more processors 1110 perform operations of the method illustrated in the above method embodiments. The one or more memories 1120 may be independent of or integrated into the one or more processors 1110.

The apparatus 1100 may further include a transceiver 1130. The one or more processors 1110 may communicate with other devices or chips through the transceiver 1130. For example, the one or more processors 1110 may transmit data to and receive data from other devices or chips through the transceiver 1130.

The embodiments of the present disclosure further provide a computer-readable storage medium configured to store programs. The computer-readable storage medium is applicable to the terminal devices or the network devices provided in the embodiments of the present disclosure, and the program causes a computer to perform operations of the method executed by the terminal devices or network devices in the various embodiments of the present disclosure.

The embodiments of the present disclosure further provide a computer program product including programs. The computer program product is applicable to the terminal devices or the network devices provided in the embodiments of the present disclosure, and the programs cause a computer to perform operations of the method executed by the terminal device or network device in the various embodiments of the present disclosure.

The embodiments of the present disclosure further provide a computer program. The computer program is applicable to the terminal devices or the network devices provided in the embodiments of the present disclosure, and the computer program causes a computer to perform operations of the method executed by the terminal device or network device in the various embodiments of the present disclosure.

It should be understood that the terms "system" and "network" in the present disclosure may be used interchangeably. In addition, the terms used in the present disclosure are only used to explain the embodiments of the present disclosure, and are not intended to limit the present disclosure. The terms "first", "second", "third", "fourth", and the like in the description, claims, and drawings of the present disclosure are used to distinguish different objects, rather than to describe a specific order. In addition, the terms "comprise" and "have" and any variations thereof are intended to cover a non-exclusive inclusion.

In the embodiments of the present disclosure, "indicate" mentioned herein may refer to a direct indication, or may refer to an indirect indication, or may represent that there is an association relationship. For example, A indicates B, which may represent that A directly indicates B, for example, B may be derived from A; or may represent that A indirectly indicates B, for example, A indicates C, and B may be derived from C; or may represent that there is an association relationship between A and B.

In the embodiments of the present disclosure, "B corresponding to A" represents that B is associated with A, and B may be determined based on A. However, it should also be understood that, determining B based on A does not only represent determining B based only on A, but instead B may be determined based on A and/or other information.

In the embodiments of the present disclosure, the term "corresponding" may represent that there is a direct or indirect correspondence between the two, or may represent that there is an association relationship between the two, or may represent that there is a relationship such as indicating and being indicated, or configuring and being configured.

In the embodiments of the present disclosure, the reference to "including" may refer to direct inclusion or indirect inclusion. Alternatively, the "including" mentioned in the embodiments of the present disclosure may be replaced by "indicating" or "for determining". For example, A includes B, which may be replaced by A indicates B, or A is used to determine B.

In the embodiments of the present disclosure, "pre-defined" or "pre-configured" may be implemented by pre-storing corresponding codes, tables, or other forms that may be used to indicate related information in devices (for example, including the terminal device and the network device), and specific implementations thereof are not limited in the present disclosure. For example, pre-defined may refer to defined in protocols.

In the embodiments of the present disclosure, the "protocol" may refer to a standard protocol in the communications field, and may include, for example, an LTE protocol, an NR protocol, and a related protocol applied to a future communications system, which is not limited in the present disclosure.

In the embodiments of the present disclosure, the term "and/or" is merely used to describe an association relationship between associated objects, indicating that there may be three relationships. For example, A and/or B may indicate that: only A exists, both A and B exist, and only B exists. In addition, the character "/" herein generally indicates an "or" relationship between the associated objects.

In the embodiments of the present disclosure, sequence numbers of the foregoing processes do not represent execution sequences. The execution sequences of the processes should be determined according to functions and internal logics of the processes, and should not be construed as any limitation on the implementation processes of the embodiments of the present disclosure.

In the embodiments provided in the present disclosure, it should be understood that, the disclosed system, apparatus, and method may be implemented in other manners. For example, the described device embodiments are merely exemplary. For example, the division of units is merely logical function division and there may be other division manners in practice. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to an actual need to achieve the objectives of the solutions of the embodiments.

In addition, function units in the embodiments of the present disclosure may be integrated into one processing unit, or each of the units may exist alone physically, or two or more units are integrated into one unit.

All or some of the foregoing embodiments may be implemented by using software, hardware, firmware, or any combination thereof. When software is used to implement embodiments, the foregoing embodiments may be implemented completely or partially in a form of computer program products. A computer program product includes one or more computer instructions. When the computer program instructions are loaded and executed on a computer, the procedures or functions according to the embodiments of the present disclosure are completely or partially generated. The computer may be a general-purpose computer, a dedicated computer, a computer network, or other programmable apparatuses. The computer instructions may be stored in a computer-readable storage medium or transmitted from one computer-readable storage medium to another computer-readable storage medium. For example, the computer instructions may be transmitted from a website, computer, server, or data center to another website, computer, server, or data center in a wired (such as a coaxial cable, an optical fiber, and a digital subscriber line (DSL)) manner or a wireless (such as infrared, wireless, and microwave) manner. The computer-readable storage medium may be any usable medium readable by the computer, or a data storage device, such as a server or a data center formed by integrating one or more usable medium. The usable medium may be a magnetic medium (for example, a floppy disk, a hard disk, or a magnetic tape), an optical medium (for example, a digital video disc (DVD)), a semiconductor medium (for example, a solid-state drive (SSD)), or the like.

The foregoing descriptions are merely specific implementations of the present disclosure, but the protection scope of the present disclosure is not limited thereto. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method for wireless communication, comprising:

receiving, by a terminal device, first configuration information that configures a first signal, wherein the first signal is a reference signal for positioning, and the first configuration information is determined based on discontinuous reception (DRX) parameters of the terminal device; and transmitting or receiving the first signal based on the first configuration information, wherein the first configuration information configures a measurement period of the first signal, wherein the measurement period of the first signal corresponding to an RRC_IDLE state of the terminal device is same as the measurement period of the first signal corresponding to an RRC_INACTIVE state of the terminal device.

2. The method according to claim 1, wherein the first configuration information further configures one or more of:

a transmission period of the first signal;

a transmission position of the first signal;

a transmission window of the first signal;

positioning measurement parameters of the terminal device; or parameters of positioning measurement gaps of the terminal device.

3. The method according to claim 2, wherein at least one of the transmission period of the first signal, the measurement period of the first signal, or the transmission position of the first signal is configured based on a radio resource control (RRC) state of the terminal device, and at least one of the transmission period of the first signal, the measurement period of the first signal, or the transmission position of the first signal is in correspondence to a DRX cycle of the terminal device.

4. The method according to claim 3, wherein the transmission period of the first signal or the measurement period of the first signal corresponding to an RRC_CONNECTED state of the terminal device is shorter than the transmission period of the first signal or the measurement period corresponding to at least one of an RRC_IDLE state or an RRC_INACTIVE state of the terminal device.

5. The method according to claim 2, wherein the transmission position of the first signal is indicated by a time-domain offset of the first signal, and the time-domain offset is determined based on the DRX parameters of the terminal device.

6. The method according to claim 2, wherein the transmission window of the first signal is a relative value configured based on the DRX parameters of the terminal device.

7. The method according to claim 2, wherein the transmission window of the first signal is configured within DRX active time of the terminal device.

8. The method according to claim 2, wherein in the transmission window of the first signal, the first signal is periodically transmitted.

9. The method according to claim 8, wherein an offset for a period of sending the first signal in the transmission window of the first signal is different from an offset for a period of the transmission window of the first signal.

10. The method according to claim 1, wherein the first configuration information is associated with RRC states of the terminal device, and the RRC states of the terminal device comprise at least one of: an RRC_CONNECTED state, an RRC_IDLE state, or an RRC_INACTIVE state.

11. The method according to claim 1, further comprising:

receiving, by the terminal device, first indication information configured for the terminal device to determine whether the first configuration information is associated with the DRX parameters of the terminal device.

12. The method according to claim 11, wherein the first indication information comprises one or more of:

whether the first signal is determined based on the DRX parameters of the terminal device;

whether positioning measurement of the terminal device is determined based on the DRX parameters of the terminal device; or whether measurement gaps for the positioning measurement of the terminal device are determined based on the DRX parameters of the terminal device.

13. The method according to claim 1, wherein the first configuration information is carried by one or more of:

a system information block;

an RRC release message received by the terminal device in response to the terminal device entering an RRC_INACTIVE state;

a non-access stratum message;

positioning assistance information received by the terminal device during positioning measurement of the terminal device; or the RRC release message received by the terminal device during the positioning measurement of the terminal device.

14. The method according to claim 1, wherein the first signal comprises one or more of: an on-demand positioning reference signal (PRS), a periodic PRS, a non-periodic PRS, a non-periodic sounding reference signal (SRS), or a periodic SRS.

15. A method for wireless communication, comprising:

sending, by a network device, first configuration information that configures a first signal to a terminal device, wherein the first signal is a reference signal for positioning, and the first configuration information is determined based on DRX parameters of the terminal device; and transmitting or receiving the first signal based on the first configuration information, wherein the first configuration information is configured to configure a measurement period of the first signal, wherein the measurement period of the first signal corresponding to an RRC_IDLE state of the terminal device is same as the measurement period of the first signal corresponding to an RRC_INACTIVE state of the terminal device.

16. A terminal device, comprising:

at least one processor; and one or more non-transitory computer-readable storage media coupled to the at least one processor and storing programming instructions for execution by the at least one processor, wherein the programming instructions, when executed, cause the terminal device to perform operations comprising:

receiving first configuration information that configures a first signal, wherein the first signal is a reference signal for positioning, and the first configuration information is determined based on discontinuous reception (DRX) parameters of the terminal device; and transmitting or receiving the first signal based on the first configuration information, wherein the first configuration information configures a measurement period of the first signal, wherein the measurement period of the first signal corresponding to an RRC_IDLE state of the terminal device is same as the measurement period of the first signal corresponding to an RRC_INACTIVE state of the terminal device.

17. The terminal device according to claim 16, wherein the first configuration information further configures one or more of:

a transmission period of the first signal;

a transmission position of the first signal;

a transmission window of the first signal;

positioning measurement parameters of the terminal device; or parameters of positioning measurement gaps of the terminal device.

18. The terminal device according to claim 17, wherein at least one of the transmission period of the first signal, the measurement period of the first signal, or the transmission position of the first signal is configured based on a radio resource control (RRC) state of the terminal device, and at least one of the transmission period of the first signal, the measurement period of the first signal, or the transmission position of the first signal is in correspondence to a DRX cycle of the terminal device.

19. The terminal device according to claim 18, wherein the transmission period of the first signal or the measurement period of the first signal corresponding to an RRC-_CONNECTED state of the terminal device is shorter than the transmission period of the first signal or the measurement period corresponding to at least one of an RRC_IDLE state or an RRC_INACTIVE state of the terminal device.

20. The terminal device according to claim 17, wherein the transmission position of the first signal is indicated by a time-domain offset of the first signal, and the time-domain offset is determined based on the DRX parameters of the terminal device.

* * * * *